United States Patent
Gao et al.

(10) Patent No.: US 9,464,245 B2
(45) Date of Patent: Oct. 11, 2016

(54) APPARATUS AND METHOD FOR MULTISTAGE HIERARCHICAL PYROLYSIS AND GASIFICATION OF SOLID FUELS

(75) Inventors: Shiqiu Gao, Beijing (CN); Guangwen Xu, Beijing (CN); Qi Zhou, Beijing (CN); Xufei Xu, Beijing (CN); Yin Wang, Beijing (CN); Qiang Li, Beijing (CN)

(73) Assignee: Institute of Process Engineering, Chinese Academy of Sciences (CN)

( * ) Notice: Subject to any disclaimer, the term of this patent is extended or adjusted under 35 U.S.C. 154(b) by 351 days.

(21) Appl. No.: 13/881,824

(22) PCT Filed: Jan. 27, 2011

(86) PCT No.: PCT/CN2011/000130
§ 371 (c)(1),
(2), (4) Date: Apr. 26, 2013

(87) PCT Pub. No.: WO2012/058851
PCT Pub. Date: May 10, 2012

(65) Prior Publication Data
US 2013/0239479 A1     Sep. 19, 2013

(30) Foreign Application Priority Data

Nov. 1, 2010   (CN) .......................... 2010 1 0526507

(51) Int. Cl.
*C10J 3/56*     (2006.01)
*C10B 49/04*    (2006.01)
(Continued)

(52) U.S. Cl.
CPC ................. *C10J 3/56* (2013.01); *B01J 8/0055* (2013.01); *B01J 8/1872* (2013.01); *B01J 8/28* (2013.01); *C10B 49/10* (2013.01); *C10B 53/04* (2013.01); *C10B 57/02* (2013.01); *C10G 1/02* (2013.01); *C10J 3/482* (2013.01); *C10J 3/60* (2013.01);
(Continued)

(58) Field of Classification Search
CPC .................................. C10J 3/721; C10J 3/15
See application file for complete search history.

(56) References Cited

U.S. PATENT DOCUMENTS

2,131,702 A * 9/1938 Berry ............................... 201/6
2,588,076 A * 3/1952 Gohr ............................... 48/206
(Continued)

*Primary Examiner* — Matthew Merkling
(74) *Attorney, Agent, or Firm* — Jack Schwartz & Associates, PLLC (57) ABSTRACT

This invention relates to an apparatus and a method for multistage hierarchical pyrolysis and gasification of solid fuels. The apparatus comprises a feeding device 1, a multistage fluidized bed reactor 6, a residual discharging valve 9, a cyclone 10 and a condenser 11. A gas inlet is provided at the bottom of the multistage fluidized bed reactor 6 and a number of stages of fluidized beds 3 are provided within the multistage fluidized bed 6, wherein the fluidized beds 3 are separated by a number of perforated distributors 5. The top stage fluidized bed 3 is connected with the feeding device 1 and the coal fed thereto is heated by char obtained from pyrolysis in this stage and the mixture of high temperature ascending pyrolysis and gasification gas to undergo pyrolysis reactions at low temperature, thereby to obtain solid particles after preliminary pyrolytic process. The solid particles flow downwards through an overflow standpipe 4/the perforated distributor 5 to the next stage of the fluidized bed and then are pyrolyzed through being heated by char and the mixture of pyrolysis and gasification gas. The solid particles in turn pass into the next stage of the fluidized bed and finally enter into the bottom stage fluidized bed to undergo gasification reactions. More light fractions in tar can be produced using the present apparatus and method.

3 Claims, 5 Drawing Sheets

(51) Int. Cl.
*C10J 3/60* (2006.01)
*C10G 1/02* (2006.01)
*C10B 49/10* (2006.01)
*C10B 53/04* (2006.01)
*C10B 57/02* (2006.01)
*C10J 3/48* (2006.01)
*B01J 8/18* (2006.01)
*B01J 8/00* (2006.01)
*B01J 8/28* (2006.01)
*C10J 3/72* (2006.01)
*C10J 3/50* (2006.01)
*C10J 3/52* (2006.01)
*C10J 3/84* (2006.01)

(52) U.S. Cl.
CPC . *C10J 3/721* (2013.01); *C10J 3/50* (2013.01); *C10J 3/52* (2013.01); *C10J 3/84* (2013.01); *C10J 2300/093* (2013.01); *C10J 2300/094* (2013.01)

(56) References Cited

U.S. PATENT DOCUMENTS 2,633,416 A * 3/1953 Gornowski et al. ............ 48/203
2,731,394 A * 1/1956 Adams et al. .................. 208/55
2,772,954 A * 12/1956 Jequier ........................... 48/202
4,099,933 A * 7/1978 Johnson et al. ................ 48/202

* cited by examiner

APPARATUS AND METHOD FOR MULTISTAGE HIERARCHICAL PYROLYSIS AND GASIFICATION OF SOLID FUELS

TECHNICAL FIELD

This invention relates generally to the field of energy and chemical industry, and particularly relates to an apparatus and a method for multistage hierarchical pyrolysis and gasification of solid fuels.

BACKGROUND OF THE INVENTION

Regarding to energy resources, China features being abundant in coal and deficient in oil and gas, and coal has accounted for nearly 70% of the total primary energy consumption for a long period, whereas the gap of oil and natural gas supply has become larger year by year. At the same time, the rapid development of China economy has created huge demand for organic chemicals, especially petroleum based chemicals, such as benzene, p-xylene, phenol, ethylene, etc. Hence, China should pay full attention to the use of its abundant coal resource, which can be transformed into scarce gas/oil fuels and chemicals to make up for the shortage of gas and oil resources.

Pyrolysis provides a mild conversion process to produce alternative oil and gas from solid fuels, such as coal, biomass, and so on. The so-called coal pyrolysis refers to the complex process wherein coal undergoes a series of physical changes and chemical reactions occurred at different temperatures after being heated under the condition of air isolation, resulting in pyrolysis gas (also known as gas), pyrolysis oil (also known as coal tar or tar), solid (char or coke) and other products. The pyrolysis of coal is also called as carbonization or thermal decomposition of coal. The coal pyrolysis process is a key step in the transformation of coal. During any one of the processes of gasification, liquefaction, coking and combustion of coal, pyrolysis reactions occur. Though the gas/oil production rate of pyrolysis of coal is far lower than those of gasification and liquefaction of coal, the coal pyrolysis process possesses many advantages from the point of view of production of alternative oil/gas and chemicals, such as mild conversion condition, short process flow, wide adaptability of coal type, high energy efficiency and low water consumption.

Since the 1970s, outside of China, many technologies for coal pyrolysis have been developed. The typical pyrolysis processes adopted rotary kiln, moving bed, fluidized bed and entrained flow reactors. The rotary kiln was used in Toscoal and Encoal processes developed by USA, and also in ATP process developed by Canada. The Toscoal and Encoal processes mainly aimed at upgrading of low rank coals, wherein target product was solid fuel char and the gas or fuel oil produced in the process were used as heating fuels. The ATP process focused on extracting oil from oil shale and the core equipment therein was a horizontal rotary kiln with multiple partitions, so the size of the equipment was large. A moving bed was used in LFC process developed by USA, Lurgi-Ruhr process developed by Germany, ETCH-175 process developed by the former Soviet Union. The LFC process implemented three-step treatment of coal, namely drying, pyrolysis and solid product finishing, wherein the heat source was the gas produced in the process and the property of char was stable after passivation treatment. The Lurgi-Ruhr process used char as a heat carrier in a moving bed pyrolyzer with mechanical agitation, and its advantages were high oil yield and low energy consumption, but the produced tar contained a large amount of dust and its discharging system was prone to be blocked, and also the wear problem became very serious due to the mechanical agitation device. The ETCH-175 process used hot powder char as a heat carrier, which led to a high tar yield but the tar contained high heavy fractions. The COED process adopted multistage fluidized bed by connecting a plurality of fluidized beds in series to realize sectional rapid heating. In the COED process, most of the tar is produced in low temperature region and the secondary pyrolysis reactions are greatly reduced. Furthermore, about 40-50% of the gas product was $H_2$ which can be used in the hydrogenation of the tar. The COED process was complex and the produced tar contained a lot of fine powder char which should be removed by filter. The CSIRO process used solid and gas heat carriers to supply heat and produced char and liquid fuels from lignite. The entrained flow reactor was used in Garrett pyrolysis process developed by USA. In the Garrett process, the pulverized coal with particle size less than 0.1 mm was mixed with high temperature heat carrier of char in the entrained flow reactor to realize reactions of coal pyrolysis by fast heating. The char was combusted with air to supply heat for the pyrolyzer. The advantages of Garrett process was its high tar yield, while its disadvantage was that the generated tar and char dust were prone to adhere to the cyclone and the inner wall of the pipe, leading to pipe blockage after long time running.

Since the 1990s, inside of China, many technologies for coal pyrolysis process and poly-generation process based on coal pyrolysis have been developed. Beijing Research Institute of Coal Chemistry of China Coal Research Institute has developed multistage rotary furnace (MRF) pyrolysis process. The MRF process mainly comprised three horizontal rotary kilns connected in series, i.e., internally heated rotary drying furnace, externally heated rotary pyrolysis furnace and quenched coke furnace, respectively. Since most of the moisture in coal was removed before pyrolysis, the process greatly reduced the amount of waste water containing phenol. Moreover, the waste water containing phenol was mixed with fresh water to be used for coke quenching, so as to avoid establishing the high cost waste water treatment system. Dalian University of Technology (DG) developed a solid heat carrier pyrolysis process which consisted of coal preparation, coal drying, coal pyrolysis, powder char heating riser, combustion of mixture of coal and char in fluidized bed, gas cooling, transporting and purification. The core technology of DG process used char as solid heat carrier and performed material treatment and heat transfer based on the amount of heat needed for coal pyrolysis in the way of fluidization. The Institute of Process Engineering, Institute of Engineering Thermophysics, Institute of Coal Chemistry of Chinese Academy of Sciences and Zhejiang University have respectively developed poly-generation processes integrated circulating fluidized bed combustion and coal pyrolysis reactor, which adopted downer, moving bed and fluidized bed pyrolyzers, respectively. The processes used the hot ash of circulating fluidized bed boiler as heat carrier to provide heat for coal pyrolysis to extract oil and gas fuels, obtaining high value chemicals contained in the coal before coal combustion, which can realize cascade utilization of coal.

The Institute of Chemical Metallurgy of Chinese Academy of Sciences invented a process and an apparatus for four kinds of products generation by solid circulating fluidization using solid hydrocarbon fuel (Patent No. ZL01110152.0), wherein fuel oil and fuel gas were firstly extracted from solid powder fuel by fast pyrolysis in circulating fluidized bed reactor, and then the produced char was burned to produce heat/electricity. This process can only apply to powder materials with particle size of 0.03-0.3 mm. The Zhejiang University disclosed a poly-generation apparatus and a method for co-producing heat, electricity, gas and tar in a circulating fluidized bed (Patent No. ZL200610154581.X), wherein oil and gas were extracted from pyrolysis of coal heated by hot ash from the circulating fluidized bed combustor and residue char was burned in the circulating fluidized bed combustor through combination of circulating fluidized bed combustion and fluidized bed pyrolysis. The Institute of Engineering Thermophysics of Chinese Academy of Sciences disclosed a fast pyrolysis method and an apparatus using solid heat carrier (Publication No. CN101353582A) in a circulating fluidized bed, which adopted a hot ash divider to realize stable distribution of high temperature circulating ash between coal combustion and pyrolysis loop. The Institute of Engineering Thermophysics of Chinese Academy of Sciences also disclosed a coal topping method (Publication No. CN101435574A), which provided a pyrolysis and gasification equipment using solid heat carrier in front of the circulating fluidized bed boiler, feeding some or all of the coal into the equipment to carry out coal topping to produce pyrolysis gas and tar, the char produced was fed to the circulating fluidized bed boiler or combustion chamber to be burned. The above-mentioned technologies belong to solid heat carrier pyrolysis process which should be coupled with circulating fluidized bed boiler, thereby subject to the insufficient retrofit space of old boilers. The Shenhua Group Corporation Limited disclosed a coal pyrolysis method for upgrading of coal (Publication No. CN101608125A). Raw coal with the size less than 30 mm was fed into a rotary dryer to realize drying of raw coal through direct heat exchange by contact with the hot flue gas and meanwhile indirect heat exchange with hot char from a rotary pyrolyzer. The dried raw coal mixed with high temperature char from the heating rotary kiln was fed into the pyrolyzer, wherein the coal was directly heated by the high temperature char to reach final pyrolysis temperature of 500-700° C. This invention used the char heat carrier to supply heat in the rotary furnace, which resulted in difficulty for hot char circulation and transport. The Institute of Process Engineering of Chinese Academy of Sciences disclosed a method and an apparatus (Publication No. CN101781583) for high value utilization of coal by pyrolysis and gasification. The coal was partially or totally pyrolyzed before gasification to separately realize pyrolysis and gasification procedures through combination of dilute-phase transport bed and dense-phase fluidized bed, so as to realize co-generation of pyrolysis gas, gasification gas and pyrolysis oil. The invention adopted the gas heat carrier to realize the coupling of pyrolysis and gasification, but the amount of fine char powders entrained in the gas was high due to the adoption of transport bed in the upper stage, so the separation of gas and solid products was a difficult problem to overcome.

At present, all of the pyrolysis processes developed globally are in pilot or industrial demonstration stage, there is yet no large-scale commercial pyrolysis plant to produce alternative oil and gas from coal. The core technical problem is the control of yield and quality of oil and gas in the pyrolysis process. Many pilot and industrial test results show that the pitch content in the tar produced in most of the pyrolysis process is greater than 50% at present. The high fraction of heavy components in the tar not only reduces the quality and the value of coal-derived oils but also causes ineffective separation of high viscosity tar and dust entrained in the system, which causes a series of operation problems and hinders the industrial application of pyrolysis technology. Therefore, it is urgent to control the quality of pyrolysis product in order to produce a large amount of alternative fuel oil, natural gas and chemicals in the industrialization of coal pyrolysis process.

SUMMARY OF THE INVENTION

The purpose of this invention is to provide an apparatus used for multistage hierarchical pyrolysis and gasification of solid fuels including coal, biomass, solid waste, oil sands, oilstone, oil shale and other solid fuels containing hydrocarbons. The utilization of this apparatus can improve the quality of the pyrolysis products, specifically can increase the light component in the tar and reduce the content of pitch component.

Another purpose of this invention is to provide a method for multistage hierarchical pyrolysis and gasification of solid fuels.

In order to solve the aforementioned technical problems, the apparatus used for multistage hierarchical pyrolysis and gasification of solid fuels according to this invention comprises a feeding device 1, a multistage fluidized bed reactor 6, a residue discharging valve 9, a cyclone 10 and a condenser 11, and wherein:

a gas inlet is provided at the bottom of the multistage fluidized bed reactor 6, which is used for injecting gasification agent to the multistage fluidized bed reactor 6 where coal pyrolysis and char gasification reactions occur to obtain pyrolysis and gasification gas with high temperature;

the multistage fluidized bed reactor 6 consists of a number of stages of fluidized bed 3 which are separated by a number of perforated distributors 5; the top stage fluidized bed is connected with the feeding device 1; wherein coal, as an example of solid fuels, is fed to the top stage fluidized bed and is heated by char from pyrolysis in this stage and the mixture of high temperature ascending pyrolysis and gasification gas and pyrolyzed at low temperature to generate preliminary pyrolytic solid particles; the preliminary pyrolytic solid particles flow downwards through an overflow standpipe 4/the perforated distributor 5 to the next stage fluidized bed to be pyrolyzed through successively being heated by high temperature char and the mixture of ascending pyrolysis and gasification gas and the solid particles in turn pass into the next stage fluidized bed; the progress of coal pyrolysis in multistage fluidized bed enhances from top stage to bottom stage and finally reaches complete pyrolysis to obtain pyrolysis gas and char; then the char from the coal pyrolysis enters into the bottom stage fluidized bed and reacts with the gasification agent provided from the bottom of the multistage fluidized bed reactor 6 to produce high temperature gasification gas and solid residue from gasification;

a residue discharging valve 9 is provided at the bottom of the multistage fluidized bed reactor 6, for discharging the char obtained from pyrolysis or the solid residue obtained from gasification;

a cyclone 10 is provided at the top of the multistage fluidized bed reactor 6, for separating the fine powder from the mixture of pyrolysis and gasification gas, wherein the fine powder is returned from the bottom outlet of the cyclone 10 to the multistage fluidized bed reactor 6 through a material returning inlet 7 at the bottom of the multistage fluidized bed reactor 6 so as to form a circulation.

As an improvement of the above embodiment, a condenser 11 is provided at the top outlet of the cyclone 10, for condensation and separation of the gas products from the pyrolysis and gasification.

As another improvement of above embodiment, a pretreatment device 2 is arranged between the feeding device 1 and the top stage of the multistage fluidized bed reactor 6, for crushing, screening and drying of the solid fuels and also for removing the moisture in the solid fuels and preheating the solid fuels.

As another further improvement of the above embodiment, a single-stage fluidized bed reactor 14 or a two-stage fluidized bed reactor 8 is arranged between said pretreatment device 2 and the multistage fluidized bed reactor 6, for preliminarily pyrolyzing the coal.

As another further improvement of the above embodiment, overflow standpipes 4 are arranged between two adjacent ones of the fluidized beds 3 in the multistage fluidized bed reactor 6, for importing incomplete pyrolytic particles into the next stage of fluidized bed to undergo further pyrolysis or gasification reactions.

As another further improvement of the above embodiment, the pyrolysis and gasification apparatus comprises a char tank 12 which is connected with the bottom of the multistage fluidized bed reactor 6, for collecting the char.

As another further improvement of the above embodiment, the pyrolysis and gasification apparatus comprises a gasifier 13 which is connected with the bottom of the multistage fluidized bed reactor 6, for gasifying the char obtained from the pyrolysis of the solid fuels.

As a further improvement of the above embodiment, the multistage fluidized bed reactor 6 is in such a structure where the diameter of the reactor 6 is variable in its axial direction.

The present invention further provides a method for multistage hierarchical pyrolysis and gasification of solid fuels, which consists of the following procedures:

1) injecting a gasification agent into the bottom stage fluidized bed in a multistage fluidized bed reactor 6 so as to undergo gasification reactions of char from pyrolysis of solid fuel in order to obtain high temperature gasification gas;

2) feeding solid fuel into the top stage fluidized bed in the multistage fluidized bed reactor 6 by a feeding device 1, wherein the solid fuel is heated by the char obtained from pyrolysis in this stage and the mixture of high temperature ascending pyrolysis and gasification gas to be pyrolyzed at low temperature, thereby obtaining solid particles after preliminary pyrolysis, then the preliminary pyrolytic solid particles flow downwards through an overflow standpipe 4/a perforated distributor 5 to the next stage fluidized bed, where the preliminary pyrolytic solid particles is further heated by high temperature char and the mixture of ascending pyrolysis and gasification gas so as to be pyrolyzed until being completely pyrolyzed, thereby obtaining pyrolysis gas and char, after which the char enters into the bottom stage fluidized bed and reacts with the gasification agent injected from the bottom of the multistage fluidized bed to undergo gasification reactions in order to produce high temperature gasification gas and solid residue;

3) discharging the char or solid residue obtained from procedure 2) from a residue discharging outlet at the bottom or one side of the bottom stage fluidized bed gasification reactor in the multistage fluidized bed reactor 6 or at the bottom of an independent gasifier 13;

4) letting the pyrolysis and gasification gas obtained from procedure 2) flow into a cyclone 10 from the gas outlet of the multistage fluidized bed reactor 6, where the fine powder entrained in the mixture of pyrolysis and gasification gas is separated, the separated fine powder being returned through a pipeline to the bottom stage fluidized bed of the multistage fluidized bed reactor 6 so as to undergo pyrolysis and gasification reactions.

As an improvement of the above method, it also includes procedure 5), wherein the gas product of the pyrolysis and gasification from procedure 4) is condensed by a condenser 11 to obtain tar and gas.

As another improvement of the above method, said procedure 2) also comprises procedures of crushing, screening and drying of the solid fuel in order to remove the moisture in the solid fuel and preheat the solid fuel.

As another improvement of the above method, the gasification agent in procedure 1) and procedure 2) is air, mixture of air and steam, mixture of oxygen and steam, or mixture of oxygen, carbon dioxide and steam.

This invention also provides an apparatus used for multistage hierarchical pyrolysis and gasification of solid fuels, which consists of:

a feeding device 1, a pretreatment device 2, fluidized beds 3, overflow standpipes 4, perforated distributors 5, a multistage fluidized bed reactor 6, a material returning inlet 7, a two-stage fluidized bed reactor 8, a residue discharging valve 9, a cyclone 10, a condenser 11, a char tank 12, a gasifier 13, a single-stage fluidized bed reactor 14, wherein the two-stage fluidized bed reactor 8 includes the first stage fluidized bed 15 and the second stage fluidized bed 16.

In the above apparatus, the feeding device 1 is connected with the pretreatment device 2 or the top stage fluidized bed in the multistage fluidized bed reactor 6. From the top stage to the bottom stage of the multistage fluidized bed reactor 6, the first stage fluidized bed, the second stage fluidized bed, . . . , the (n−1)-th stage fluidized bed and the n-th stage fluidized bed are arranged in sequence. The exit at the bottom of the multistage fluidized bed reactor 6 is connected with the residue discharging valve 9. The n-th stage fluidized bed in the multistage fluidized bed reactor 6 can be connected with the gasifier 13 or the char tank 12. The gas produced from the gasifier 13 can be exhausted or connected with the bottom of the n-th stage fluidized bed. The top of the first stage fluidized bed in the multistage fluidized bed reactor 6 is connected with the cyclone 10. The cyclone 10 is connected with the condenser 11. The fine powder separated from the cyclone 10 is connected with the material returning inlet 7 at the n-th stage fluidized bed. Preferably, a single-stage fluidized bed reactor 14 or a two-stage fluidized bed reactor 8 can be provided between the pretreatment device 2 and the multistage fluidized bed reactor 6. The two-stage fluidized bed reactor 8 comprises the first stage fluidized bed 15 and the second stage fluidized bed 16.

Assuming the multistage fluidized bed reactor 6 comprises five stages of fluidized beds, its implementation procedure will be explained in details as follows. Raw coal, as an example of solid fuels, is firstly treated and screened by a coal processing device, then the coal with a certain particle size (<10 mm) is fed through the feeding device 1 into the pretreatment device 2, where the coal is dried to remove moisture therein and preheated to a temperature of from about 100□ to about 200□ using hot air or flue gas produced from combustion. The pretreated coal is then fed to the top stage fluidized bed in the multistage fluidized bed reactor 6, where the coal is heated to a temperature of from 300□ to 350□ by char obtained from pyrolysis in this stage and the mixture of high temperature ascending pyrolysis and gasification gas to be pyrolyzed at a low temperature to generate a small amount of pyrolytic oil and gas. The preliminary pyrolytic coal particles flow into the second stage fluidized bed through an overflow standpipe 4 in the top stage fluidized bed 3, where the coal particles are heated to a temperature of from 400□ to 450□ by high temperature char obtained from pyrolysis in this stage and the mixture of ascending pyrolysis and gasification gas to be pyrolyzed at a low temperature to generate a large amount of light pyrolysis oil and gas. Thereafter the produced char flows into the third stage fluidized bed through an overflow standpipe in the second stage fluidized bed, to be pyrolyzed at a temperature of from 500□ To 550□ to generate a large amount of pyrolysis oil and gas. Next, the produced char flows into the fourth stage fluidized bed through an overflow standpipe in the third stage fluidized bed, to be pyrolyzed at a temperature of from 600□ to 650□ to generate the remaining pyrolysis oil and gas. The char obtained after complete pyrolysis flows into the fifth stage fluidized bed through an overflow standpipe in the fourth stage fluidized bed, where the char is gasified by a gasification agent supplied from the bottom of the fifth stage fluidized bed at a temperature of from 850□ to 100□. The produced gas enters into the upper stage pyrolysis beds to be used as heat source for pyrolysis reaction and mixes with the pyrolytic gas generated in each of the upper stage beds. Also, the pyrolysis and gasification gas entrained part of fine powder passes into a cyclone 10 to separate the gas and solid therein. The fine powder separated by the cyclone 10 is returned to the bottom stage fluidized bed through a pipe and the material returning inlet 7 at the bottom of the multistage fluidized bed reactor 6 to undergo gasification reactions, thereby forming a circulation system. The pyrolysis and gasification gas separated by the cyclone 10 passes into a condenser to separate the gas and tar therein. A residue discharging outlet is provided at the bottom or one side of the bottom stage fluidized bed, for discharging the char and solid residue at a regular interval in order to maintain material and energy balance in the system and obtain high quality char fuel.

According to the present invention, a method for multistage hierarchical pyrolysis and gasification of solid fuel to improve the quality of pyrolytic product, consists of the following procedures:

(1) The solid fuel is firstly crushed and screened by a pretreatment device to obtain the solid fuel with certain particle size (being less than 10 mm), then the obtained solid fuel particles are dried to remove moisture and preheated to a temperature of from about 100□ To about 200□.

The above solid fuel may be coal, biomass, solid waste, oil sands, oilstone, oil shale and other combustible solid fuels containing hydrocarbons.

(2) The solid fuel after pretreatment or without pretreatment is fed to the top stage fluidized bed in a multistage fluidized bed reactor, where the solid fuel is heated to a temperature of from 300□ to 350□ by the char obtained from pyrolysis in this stage and the mixture of high temperature ascending pyrolysis and gasification gas to be pyrolyzed at a low temperature to generate a small amount of pyrolysis oil and gas. The preliminary pyrolytic fuel particles flow into next stage of the fluidized beds through an overflow standpipe/a distributor in this stage, where the solid fuel is heated to a higher temperature by high temperature char produced from pyrolysis in this stage and the mixture of ascending pyrolysis and gasification gas, to undergo further pyrolysis reactions with higher temperatures until complete pyrolysis reaction is finished. The char obtained flows through an overflow standpipe/a perforated distributor into the bottom stage fluidized bed or an independent gasifier, where the char is gasified partially or completely at a temperature of from 850□ to 1000□.

(3) The gas produced in the fluidized bed gasification reactor enters into the upper stage fluidized beds to be used as a heat carrier, and the produced char or solid residue can be discharged from a residue discharging outlet provided at the bottom or one side of the gasification reactor. The gas product in procedure (2) is in the form of gas in the multistage fluidized bed reactor 6 and entrains a small amount of fine powder. The gas passes from the first stage fluidized bed into a cyclone to separate the gas and solid therein. The fine powder separated by the cyclone is returned to the bottom stage fluidized bed to undergo pyrolysis and gasification reactions. The produced gas is condensed and separated to get tar and gas.

The above gasification agent supplied to the bottom stage fluidized bed may be air, mixture of air and steam, mixture of oxygen and steam, or mixture of oxygen, carbon dioxide and steam.

Figure 1:
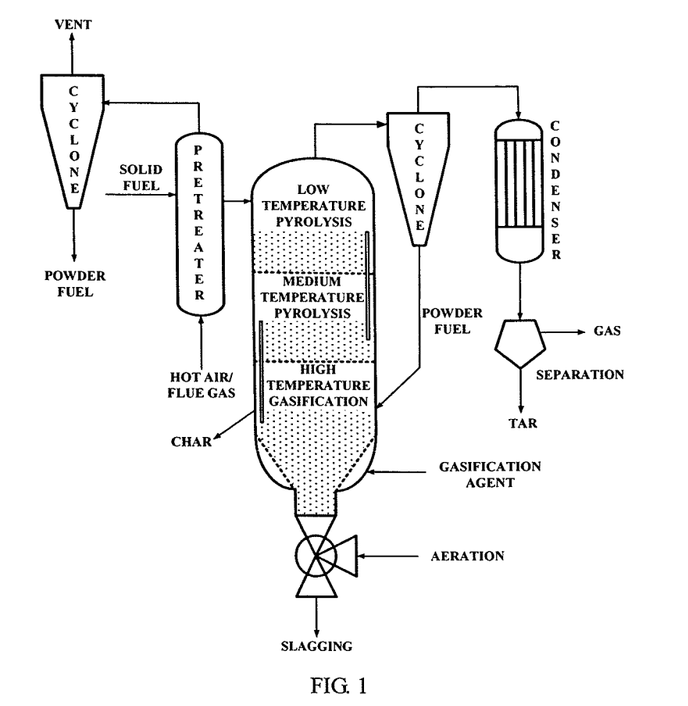
FIG. 1 is a principle diagram of the multistage hierarchical pyrolysis and gasification of solid fuels of the present invention.

The principle of the invention is shown in FIG. 1. The system for multistage fluidized bed hierarchical pyrolysis and gasification of solid fuels mainly comprises a pretreatment device, a multistage fluidized bed reactor for pyrolysis and gasification, and products separating and collecting devices. During the process of pyrolysis and gasification of solid fuels, the heat produced from the gasification of the char in a lower stage fluidized bed is provided to an upper stage fluidized bed for the pyrolysis reaction therein; the fed fuel flows downwards through the overflow standpipes/distributors gradually to each of the stages of the multistage fluidized bed reactor to be pyrolyzed to get high quality oil and gas. Specifically, as a preferred embodiment, solid fuel measured by a feeding device is fed to a pretreatment device to be dried, and then transported into the top stage fluidized bed in the present multistage fluidized bed pyrolysis reactor and overflows downwards through the overflow standpipes/distributors. The solid fuel is pyrolyzed in each of the several stages of the fluidized beds and finally is gasified at the bottom stage fluidized bed. The high temperature gas produced from the gasification of the solid fuel flows upwards through the char layer to contact with the solid fuel and finally passes into a cyclone to separate the fine powders which can be returned to the bottom stage to undergo further pyrolysis and gasification reactions. The produced gas is separated by a condenser to get tar and gas.

The beneficial effects and advantages of the method and apparatus in this invention are as follows. (1) The multistage fluidized bed pyrolysis of solid fuels can bring about temperature gradient along the beds to prolong the residence time of solid fuel particles at low temperatures, thus most of the tar being produced in low temperature region, reducing the secondary cracking reaction under high temperature and so improving the quality and yield of light oil; (2) the char in the upper stage of the multistage fluidized bed reactor has in-situ catalytic effect for the heavy component produced from pyrolysis in the lower stage to effectively improve the quality of the pyrolysis products by catalytic reforming the heavy component from pyrolysis to generate light component; (3) the char obtained from pyrolysis in the upper stage of the multistage fluidized bed reactor is gasified by the oxygen and steam supplied from the bottom stage fluidized bed to produce syngas which is used as a heat carrier for pyrolysis reaction; the solid fuel particles are pyrolyzed under the syngas atmosphere from the top stage to the bottom stage of the beds, which makes the macromolecular radicals from pyrolysis of solid fuel combine with extraneous small molecules active radicals to produce light components, thus inhibiting polycondensation reaction of macromolecular radicals to form heavy components.

The numerals in the drawings are described herein.

1. Feeding device; 2. Pretreatment device; 3. Fluidized beds; 4. Overflow standpipes; 5. Perforated distributors; 6. Multistage fluidized bed reactor; 7. Material returning inlet; 8. Two-stage fluidized bed reactor; 9. Residue discharging valve; 10. Cyclone; 11. Condenser; 12. Char tank; 13. Gasifier; 14. Single-stage fluidized bed reactor; 15. The first stage of a two-stage fluidized bed reactor; 16. The second stage of a two-stage fluidized bed reactor.

SPECIFIC IMPLEMENTATION WAY

This invention is described with reference to the particular implementations as follows. These implementations are used only for the purpose of illustration of this invention, which are not in any way intended to limit the scope of the present invention.

FIG. 1 is a principal diagram of the multistage hierarchical pyrolysis and gasification of solid fuels of the present invention.

Figure 2:
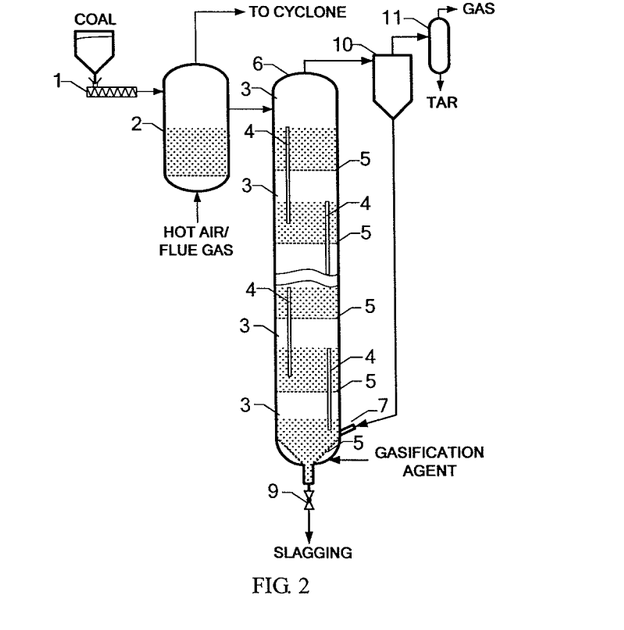
FIG. 2 is a process flowchart of the present multistage fluidized bed with overflow standpipes for pyrolysis and gasification of solid fuels with a pretreatment device.

As shown in FIG. 2, a multistage fluidized bed reactor 6 is a five-stage fluidized bed reactor with overflow standpipes, in which adjacent stages are separated by perforated distributors 5. Raw coal is first treated and screened by a processing device, after which the coal with a certain particle size (<10 mm) is fed by a feeding device 1 to a pretreatment device 2, where the coal is dried to remove moisture and preheated to a temperature of from about 100□ to about 200□ by using hot air or flue gas from combustion. Then the coal is fed to the top stage fluidized bed in the multistage fluidized bed reactor 6, where the coal is heated to a temperature of from 300□ to 350□ by the char obtained from pyrolysis in this stage and the mixture of high temperature ascending pyrolysis and gasification gas so as to be pyrolyzed at a low temperature, thereby generating a small amount of pyrolysis oil and gas. The preliminary pyrolytic coal particles flow into the second stage fluidized bed through the overflow standpipe 4 in the first stage fluidized bed, where the coal particles are heated to a temperature of from 400□ to 450□ by high temperature char obtained from pyrolysis in this stage and the mixture of ascending pyrolysis and gasification gas so as to be pyrolyzed at a low temperature, thereby generating a large amount of light pyrolysis oil and gas. Then the char produced flows into the third stage fluidized bed through the overflow standpipe in the second stage fluidized bed, and is pyrolyzed at a temperature of from 500□ to 550□ to generate a large amount of pyrolysis oil and gas. Thereafter the char obtained after pyrolysis flows into the fourth stage fluidized bed through the overflow standpipe in the third stage fluidized bed, and is pyrolyzed at a temperature of from 600□ to 650□ to generate the remaining pyrolysis oil and gas. The char obtained after complete pyrolysis flows into the fifth stage fluidized bed through the overflow standpipe in the fourth stage fluidized bed, where the char is gasified at a temperature of from 850□ to 1000□ by the gasification agent supplied from the bottom of the fifth stage fluidized bed. The produced gasification gas enters into the upper pyrolysis stage to mix with pyrolysis gas generated in upper pyrolysis stage for using as heat source for pyrolysis reaction. The pyrolysis and gasification gas entrained part of fine powder passes into cyclone 10 to separate gas and solid. The fine powder separated from the cyclone is returned to the bottom fluidized bed through pipe and the material returning inlet 7 at the bottom of fluidized bed reactor to undergo gasification reactions, which forming a circulation system. The pyrolysis and gasification gas separated from the cyclone passes into condenser 11 to separate gas and tar. A residue discharging value 9 is installed at the bottom of fluidized bed, which is used for discharging char and solid residue at regular intervals in order to maintain material and energy balance in the system and get high quality char fuel.

Figure 3:
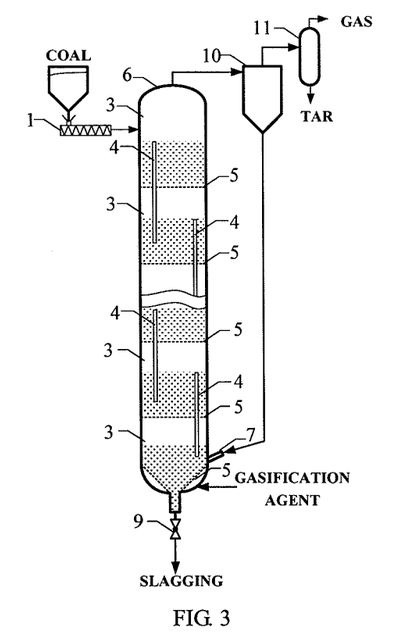
FIG. 3 is a process flowchart of the present multistage fluidized bed with overflow standpipes for pyrolysis and gasification of solid fuels without a pretreatment device.

As shown in FIG. 3, there is not a pretreatment device as that in FIG. 2, wherein the raw coal, without being dried by a pretreatment device, is directly fed through the screw feeder to the top stage of the multistage fluidized bed reactor 6. The first stage fluidized bed functioning as a drying device and a pyrolysis reactor, is suitable for coal whose water content is less than 10%, therefore the investment in equipment can be saved.

Figure 4:
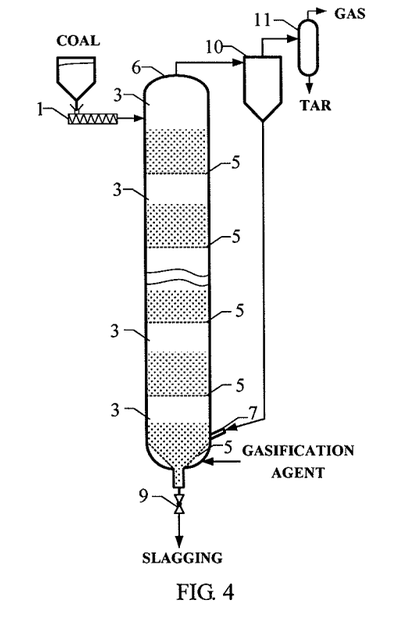
FIG. 4 is a process flowchart of a perforated plate type multistage fluidized bed without overflow standpipes for pyrolysis and gasification of solid fuels of the present invention.

As shown in FIG. 4, no overflow standpipe is arranged in the multistage fluidized bed reactor 6 as that in FIG. 3, instead, perforated plate are used. Raw coal flows downwards through the hole of perforated plate into the lower stage fluidized bed, wherein the opening ratio of the perforated plate is from 20% to 50% according to the residence time of the solid materials.

Figure 5:
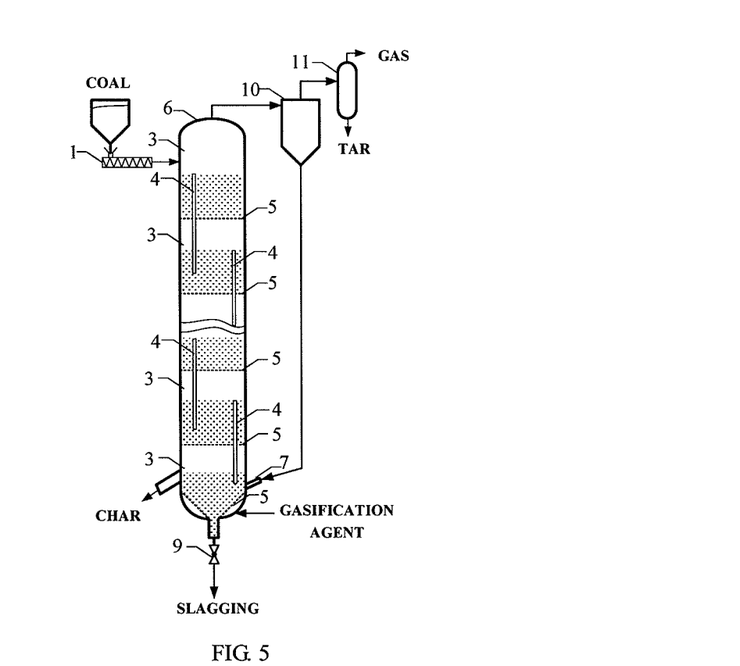
FIG. 5 is a process flowchart of the present multistage fluidized bed for pyrolysis and gasification of solid fuels with an overflow pipe at one side of the bed for discharging product.

As shown in FIG. 5, an exit of the overflow pipe is arranged on one side at the bottom of the multistage fluidized bed reactor 6, through which the high quality char obtained from the pyrolysis is discharged after a certain residence time. This embodiment is applicable to such a situation where the char undergoes partial gasification and the remaining char is discharged as product, wherein the residue discharging outlet at the bottom is only used for discharging the solid residue after coal gasification.

Figure 6:
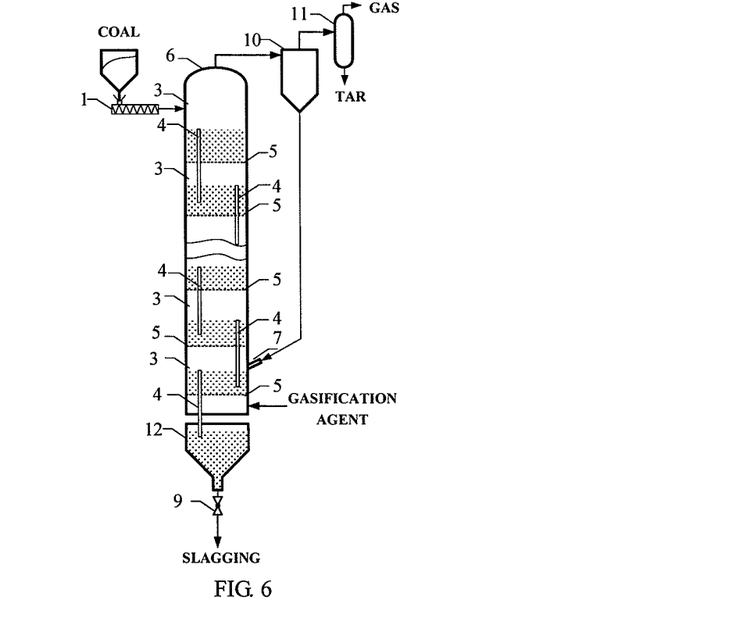
FIG. 6 is a process flowchart of the present multistage fluidized bed for pyrolysis and gasification of solid fuels with an overflow standpipe at the bottom for discharging materials.

As shown in FIG. 6, the mode of char overflow is different from that in FIG. 5, wherein the char overflows through the overflow standpipe in the bottom stage of the fluidized bed into the char tank 12 located at the bottom, where the char, after being cooled to recycling the heat thereof, is discharged from the residue discharging outlet. This case is also applicable to such a situation, where the char is subject to partial gasification and the remaining char is discharged as product.

Figure 7:
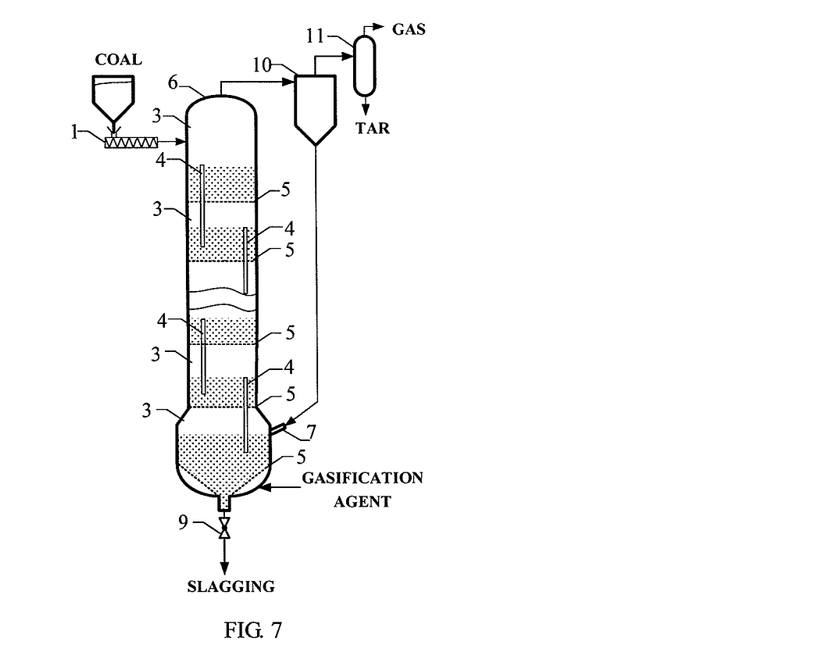
FIG. 7 is a process flowchart of the present multistage fluidized bed for pyrolysis and gasification of solid fuels with variable diameters of the gasification stage at the bottom of the bed.

As shown in FIG. 7, the diameter of the gasification section at the lower part of the multistage fluidized bed reactor 6 is larger than that of the pyrolysis section at the upper part of the multistage fluidized bed reactor, which can prolong the residence time of gasification reaction at the bottom stage of multistage fluidized bed reactor 6. This structure is applicable to such a situation that complete gasification of char is realized to produce industrial fuel gas or syngas.

Figure 8:
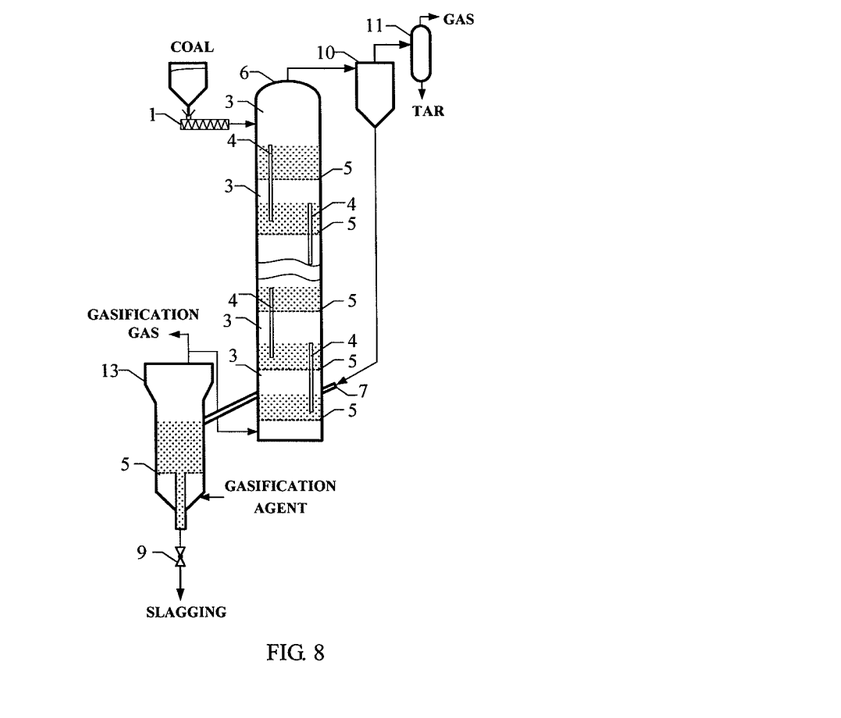
FIG. 8 is a process flowchart of the present multistage fluidized bed for pyrolysis and gasification of solid fuels with an independent gasifier.

As shown in FIG. 8, an independent gasifier 13 is arranged at one side of the multistage fluidized bed reactor 6. Coal is pyrolyzed in the multistage fluidized bed reactor 6 and the char obtained in the bottom-stage fluidized bed passes through a connecting pipe into the gasifier 13 to undergo gasification reaction, after which the produced gas with high temperature can be returned to the bottom of the multistage fluidized bed reactor 6 to provide heat for use in pyrolysis reaction, or a part of the produced gas can be output as gas product, which happens according to the heat balance between the pyrolysis and gasification reactions. By using the independent gasifier 13, the adjustment of the residence time of the char in the gasification reactor and the heat balance between the pyrolysis and gasification reactions can be implemented flexibly.

Figure 9:
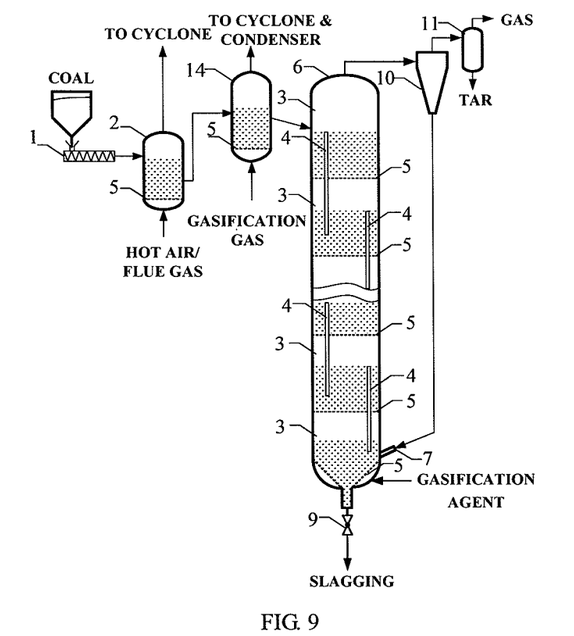
FIG. 9 is a process flowchart of the present multistage fluidized bed for pyrolysis and gasification of solid fuels by combined with a single-stage fluidized bed.

As shown in FIG. 9, a pretreatment device and a single-stage fluidized bed 14 are provided in front of the multistage fluidized bed reactor 6. Pretreated coal is fed to the single-stage fluidized bed and heated to a temperature of from 300□ to 350□ by char obtained from pyrolysis and high temperature gasification gas, thereby being pyrolyzed at a low temperature to generate a small amount of pyrolysis oil and gas. The generated pyrolysis oil and gas are separated from the cyclone and condenser to get light tar. The preliminary pyrolytic coal particles flow into the multistage fluidized bed reactor 6 through the pipe between the single-stage fluidized bed and the multistage fluidized bed reactor 6 to continuously undergo pyrolysis reaction at higher temperatures. Because the pyrolysis temperature in the top stage of multistage fluidized bed reactor 6 is raised, the condensation of heavy tar, occurred at a low temperature, can be avoided in the top stage of multistage fluidized bed reactor 6 to prevent the blockage of the distributor by the tar. Due to the independent separation of light oil and gas obtained from the low temperature pyrolysis in the single-stage fluidized bed, the light tar can be concentrated to facilitate subsequent processing of the tar product.

Figure 10:
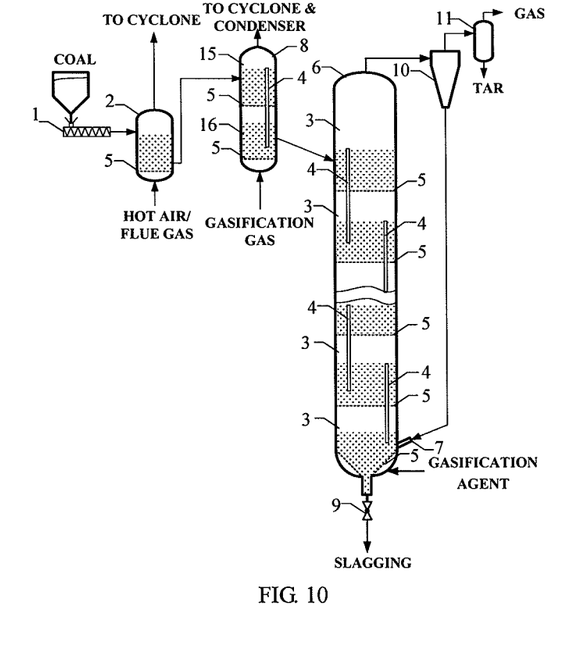
FIG. 10 is a process flowchart of the present multistage fluidized bed for pyrolysis and gasification of solid fuels by combined with a two-stage fluidized bed.

As shown in FIG. 10, a pretreatment device and a two-stage fluidized bed 8 are provided in front of the multistage fluidized bed reactor. Pretreated coal is fed to the first stage 15 of the two-stage fluidized bed and heated to a temperature of from 300° C. to 350° C. by the char obtained from pyrolysis and the mixture of high temperature pyrolysis and gasification gas, thereby to be pyrolyzed at a low temperature to generate a small amount of pyrolytic oil and gas. The preliminary pyrolytic coal particles flow into the second stage 16 of the two-stage fluidized bed through the overflow standpipe in the first stage fluidized bed 15, where the coal particles are heated to a temperature of from 400° C. to 450° C. by high temperature char obtained from pyrolysis in this stage and the mixture of ascending pyrolysis and gasification gas, to be continuously pyrolyzed at a low temperature to generate a large amount of light pyrolysis oil and gas. The generated pyrolysis oil and gas is separated from the cyclone and condenser to get light tar. The coal particles, after low temperature pyrolysis, flow into the multistage fluidized bed through the pipe between the two-stage fluidized bed and the multistage fluidized bed, thereby to continuously undergo pyrolysis reactions. Because of the separation of low temperature pyrolysis and medium temperature pyrolysis, the pyrolysis temperature of the top stage of the multistage fluidized bed reactor 6 is raised, the condensation of heavy tar at a low temperature in the top stage of multistage fluidized bed reactors 6 can be avoided to prevent the blockage of the distributor by tar. Due to the independent separation of the light oil and gas obtained from low temperature pyrolysis in the two-stage fluidized bed, the light tar can be concentrated to facilitate subsequent processing of the tar product.

Finally it should be understood that the above implementations are only disclosed to describe the technical scheme of this invention rather than limitation. Although this invention has been described in detail with reference to the implementations, the ordinary technical personnel in this field should understand that any modifications or equivalent replacement of the technical scheme in this invention are all within spirit and scope of the technical scheme in this invention, which should be included in the scope of the claims of the present invention.

What is claimed is:

1. A method for multistage hierarchical pyrolysis and gasification of solid fuels in a five-stage fluidized bed reactor, comprising:
   1) injecting a gasification agent into a bottom stage fluidized bed in the five-stage fluidized bed reactor to establish a temperature gradient along the bottom stage fluidized bed to prolong a residence time of a solid fuel particle at reduced temperatures to undergo gasification reactions of char from pyrolysis of solid fuel to obtain high temperature gasification gas;
   2) feeding solid fuel into a top stage fluidized bed in the five-stage fluidized bed reactor by a feeding device, wherein the solid fuel is heated to a temperature of from 300° C. to 350° C. by char obtained from pyrolysis in this stage and a mixture of high temperature ascending pyrolysis and gasification gas to be pyrolyzed at a low temperature, thereby generating a small amount of pyrolysis oil and gas;
   preliminary pyrolytic coal particles flow downwards through an overflow standpipe/a perforated distributor into a second stage fluidized bed, wherein the coal particles are heated to a temperature of from 400° C. to 450° C. by high temperature char obtained from pyrolysis in this stage and the mixture of ascending pyrolysis and gasification gas pyrolyzed at the low temperature, thereby generating an amount of light pyrolysis oil and gas;
   the char produced flows into a third stage fluidized bed and is pyrolyzed at a temperature of from 500° C. to 550° C. to generate an amount of pyrolysis oil and gas; thereafter the char obtained after pyrolysis flows into a fourth stage fluidized bed through the overflow standpipe in the third stage fluidized bed, and is pyrolyzed at a temperature of from 600° C. to 650° C. to generate a remaining pyrolysis oil and gas;

char obtained after complete pyrolysis flows into the bottom stage fluidized bed throughout the overflow standpipe in the fourth stage fluidized bed, where the char is gasified at a temperature of from 850° C. to 1000° C. by the gasification agent supplied from a bottom of a fifth fluidized bed to produce high temperature gasification gas and solid residue;

3) discharging the char or solid residue obtained from 2) from a residue discharging outlet at a bottom or one side of the bottom stage fluidized bed gasification reactor in the five-stage fluidized bed reactor or at a bottom of an independent gasifier;

4) letting the pyrolysis and gasification gas obtained from 2) flow into a cyclone from a gas outlet of the five-stage fluidized bed reactor, where fine powder entrained in the mixture of pyrolysis and gasification gas is separated, the separated fine powder being returned through a pipeline to the bottom stage fluidized bed of the five-stage fluidized bed reactor to undergo pyrolysis and gasification reactions; and 5) a gas product of the pyrolysis and gasification from 4) is condensed by a condenser to obtain tar and gas.

2. The method for multistage hierarchical pyrolysis and gasification of solid fuels as in claim 1, wherein feeding solid fuel further comprises crushing, screening and drying the solid fuel to remove moisture in the solid fuel and preheat the solid fuel.

3. The method for multistage hierarchical pyrolysis and gasification of solid fuel as in claim 1, wherein said gasification agent is at least one of air, a mixture of air and steam, a mixture of oxygen and steam and a mixture of oxygen, carbon dioxide and steam.

\* \* \* \* \*